INVENTOR.
O. P. SATHER
BY
Richard P. Cardew
AGENT

April 17, 1956 — O. P. SATHER — 2,742,155
OIL FILTER

Filed Nov. 15, 1951 — 2 Sheets-Sheet 2

INVENTOR.
O. P. SATHER
BY Richard P. Cardew
AGENT

United States Patent Office 2,742,155
Patented Apr. 17, 1956

2,742,155

OIL FILTER

Olaf P. Sather, Duluth, Minn.

Application November 15, 1951, Serial No. 256,561

2 Claims. (Cl. 210—131)

This invention relates to oil filters and has special reference to means for insuring thorough filtering of oil.

Large commercial vehicles, such as heavy-duty trucks, buses and the like, are expected to travel many thousands of miles before they are replaced or even before they must undergo a major overhaul. Proper lubrication plays a large part in making this possible, as it is well known that proper lubrication prevents undue wear. It is generally accepted that oil will not wear out or outgrow its usefulness for a considerable length of time; however, the oil will pick up dirt which must be removed therefrom to prevent its causing wear and damage to the working parts of the vehicle. Thus the use of oil filters has developed to insure clean oil for proper lubrication. If an inadequate filter is used, costly repair and overhaul will result.

It has been found that, among oil filter devices in common use, so-called "throw-away filter cartridges" are quite expensive to use, and the so-called "repackable filter cartridges" are not efficient in their desired functioning. This inefficiency is due, mainly, because the filter material packed in the cartridge is not packed firmly enough and "channeling" develops therein; that is, because of the looseness or insufficiency of filter material in the cartridge, the oil (which, as is well known, is under pressure in the filter device) forces channels or passageways through the material along which oil may pass freely through the filter material without obtaining any benefit therefrom. The oil merely passes through the filter device with little, if any, filtering action taking place. For this reason, there has been no great commercial success in repackable filter cartridges even though they are less expensive than "throw-away" cartridges.

It is, therefore, one of the principal objects of this invention to provide a filter cartridge which may be repacked to take advantage of lower costs of this type of filter, yet which will prevent channels from developing in the filter material even if the material is not packed firmly or if an insufficient quantity of filter material is used.

A more specific object is to provide a filter cartridge which is of such construction that the mass of filter material within the cartridge is maintained under sufficient pressure at all times during the operation thereof within an oil filter housing to prevent channeling and to insure proper filtering action on all oil passing through the filter.

Another such object is to provide a filter cartridge having a cylindrical body portion to receive filter material, the outer surface of the cylinder being provided with many openings spaced thereabout to permit oil to pass therethrough, and a tubular member extending axially through the cylinder, the tubular member having relatively few openings, as compared to said cylinder body, through which oil may pass whereby when said cartridge is in operation within an oil filter housing, the oil pressure adjacent said tubular member will be less than the oil pressure at the outer walls and ends of said cylinder whereby a portion of said cylinder may be caused to move inwardly by the higher oil presure to maintain said filter material in its desired compressed state, and thereby prevent oil from passing through said material and into said tubular member without having been filtered.

Another object is to provide a filter housing for cooperative use with the filter cartridge in its desired operation.

These and other objects and advantages of the invention will become more apparent as the description proceeds.

In the accompanying drawing forming a part of this application:

Figure 1 is a central vertical sectional view of an oil filter made in accordance with my invention ready for installation to filter oil or the like.

Figure 1:
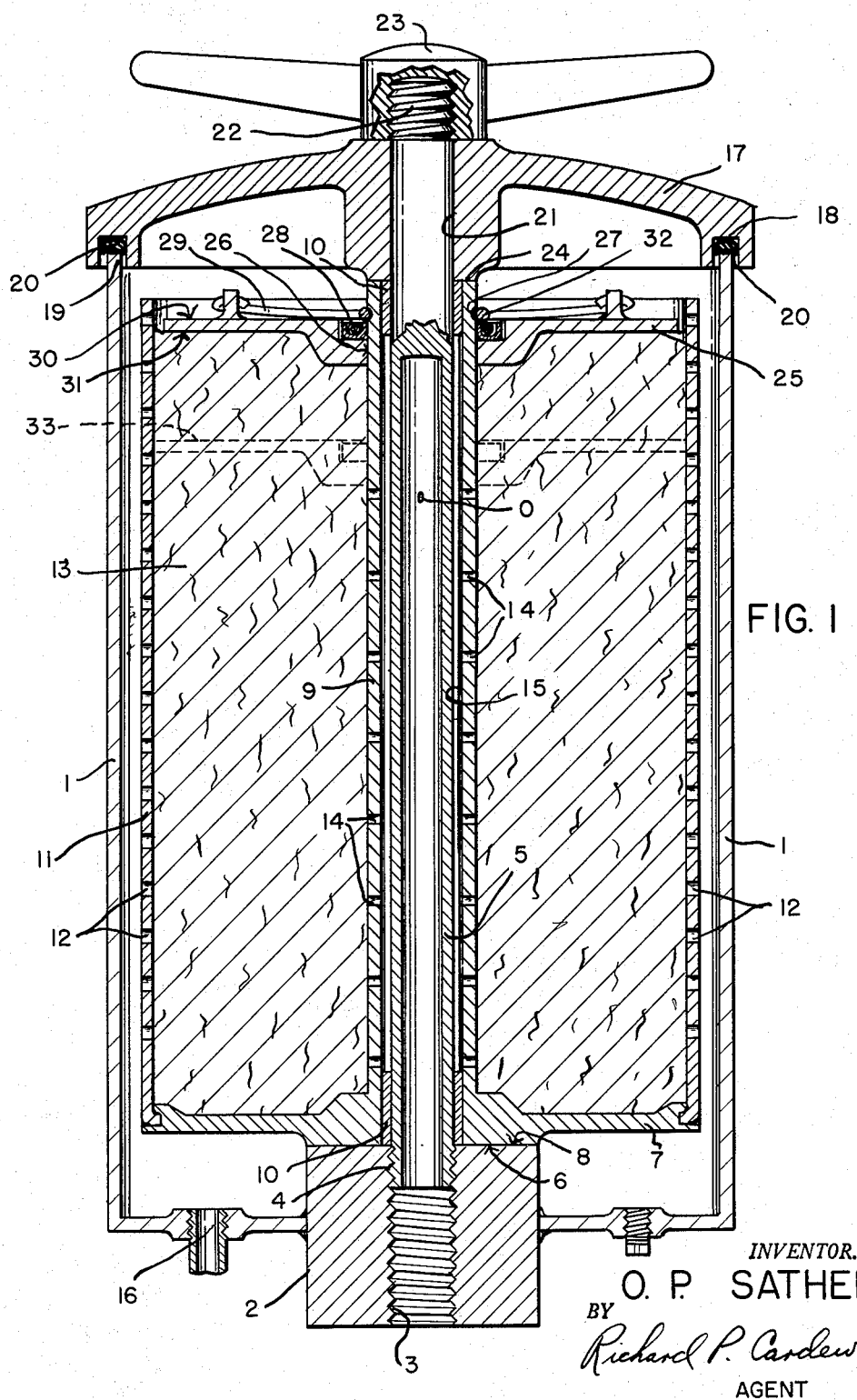
Figure 2:
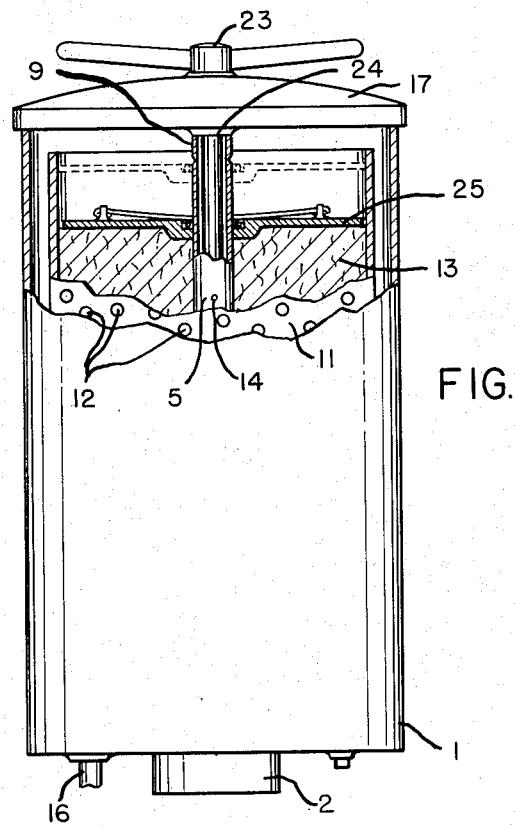
Figure 2 is a reduced side elevational view of the filter device with parts broken away to illustrate the operation thereof.
Figure 4:
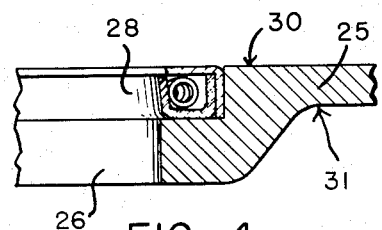
Figure 4 is an enlarged fragmental sectional view of the oil seal arrangement for the movable closure device for the oil cylinder.
Figure 3:
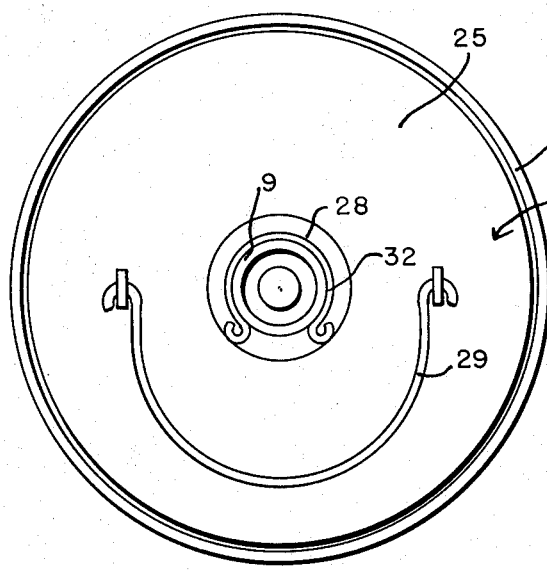
Figure 3 is a top plan view of the filter cartridge.

In my co-pending application for Patent Serial Number 100,236 filed June 20, 1949, of which the present application is a continuation-in-part, now Patent No. 2,614,694, I have shown a repackable oil filter cartridge.

In the drawings, the reference numeral 1 indicates the housing or casing of an oil filter, the housing preferably being cylindrical, as shown, and having one closed end and one open end. Centrally of the closed end of the housing, I have provided a boss 2 having an axial bore 3—4 therethrough, one end 3 of which is threaded to receive a conventional oil line fitting, to provide an oil outlet from the housing, the opposite end 4 of the bore 3—4 being threaded to receive one end of the tubular rod 5 which extends axially within and through the cylinder and projects outwardly of the cylinder, as shown, the purpose of which will become apparent. The upper end of the tubular rod 5 is closed, and the rod is provided with a relatively small opening O through the walls thereof to permit oil within the housing to pass therethrough, from the housing, into the hollow center of the rod 5, to and through the oil outlet where it passes back through to the oil sump of the engine or motor to which the filter is attached.

The boss 2 preferably extends into the housing 1 slightly to provide a machined seat 6 for the oil filter cartridge which is installed and carried within the housing.

The cartridge for the filter is preferably of the repackable type, and comprises a base 7 which has a machined seat 8 to engage the seat 6 to prevent oil from leaking therebetween. Of course, a gasket could be used between the seats 6 and 8 for this purpose; however, the machined seats are preferred, as this eliminates the possibility of poor filtering of oil if a mechanic should happen to forget to install the required gasket. A tubular member 9 is mounted centrally of the base 7 to extend perpendicularly thereto, the member 9 being of larger diameter than the rod 5 whereby it may surround the rod when the cartridge is in place in the housing. The member 9 is provided at each end with a machined bushing 10—10 to provide a guide and a snug mounting on the rod 5 of the member 9. As shown, the tube 9 is shorter than the rod 5 and extends to closely adjacent the upper end of the housing 1, the purpose of which will become apparent.

The body 11 of the filter cartridge is carried on and secured to the base and is of similar construction to the housing 1, except that it is smaller in diameter to fit inside the housing 1, is of less length longitudinally, and has an abundance of perforations or openings 12 spaced about substantially the entire area of its walls to permit oil within the housing to pass from the housing into the cartridge body to be filtered by the filtering medium or material 13 which normally fills the cartridge body, the body 11 and base 7 providing a container for the material 13. The tubular member 9 is provided with small openings 14 through its walls to permit filtered oil to pass into the chamber or space 15 between the tube 9 and the rod 5, after which the oil will pass through the opening O and the oil outlet it will be noted in Fig. 1, that the openings 14 in tubular member 9 are less in number than openings 12 in tubular member 11. This construction materially aids in the creation of the necessary differential oil pressure more fully described hereinafter.

An oil inlet 16 is provided to supply oil under pressure into the housing 1 whereby the oil is forced through the filtering material 13 before it can leave the filter housing via the oil outlet 3.

A cover 17 is provided to close the open end of the housing 1, the cover having an annular groove 18 around its outer margin into which the open end 19 of the casing 1 fits. The groove 18 has a gasket or seal 20 therein to engage the end 19 of the housing and provide an oil tight seal when the cover is installed. As shown, the cover has an axial opening 21 therethrough through which the outwardly extending end of the rod 5 extends, said outer end being threaded as at 22 to receive the wing nut 23 which clamps the cover firmly in place.

It is to be noted that the cover 17 has an annular machined seat 24 surrounding the axial opening 21 which engages the upper end of the tubular member 9 and thereby clamps the cartridge firmly in place in the housing 1, forcing the seats 6 and 8 firmly together, and forming an oil tight seal at each end of the tubular member 9. Also, it is to be noted that the tightening of the wing nut compresses the seal or gasket 20 so that an oil tight seal is obtained around the cover simultaneously with the seating of the cartridge, whereby oil pressure may be obtained and maintained in the housing 1.

As may be seen from the drawing, the filter material 13 is contained within the body of the filter cartridge which is of rigid construction as far as the description has proceeded. However, I have provided means for a portion of the cartridge body to move and be moved inwardly as required to compress the filter material and prevent channels from forming therein.

As shown in the drawings, the above mentioned means comprises a cap 25 which is slightly smaller in size than the opening in the end of the body 12 of the filter cartridge, whereby the cap will readily fit into the body 12 and may move longitudinally thereof. The cap 25 forms a part of the filter cartridge and has an axial hole 26 therethrough whereby the cap may be carried on the tubular member 9 to form a closure-like end member for the cartridge body, the hole being of such character as to maintain the cap at substantially right angles to the tube.

In operation, the body 12 of the filter is packed full of filter material 13, the material being preferably as firmly compacted as possible, of course, with the material filling the space between the body 12 and the tubular member 9. When certain types of filter material are used, which have fine fibers or the like which might become loose from the filter material mass and thereby be carried through the oil lines, it is desirable to place a fine fabric tube around the member 9 before the material is packed into the container to prevent fine particles of filter material from entering the oil lines.

When the body is packed full, the cap 25 is placed on the tube and pressed inwardly along the tube, which causes the material 13 in the cartridge to be further compressed, until the outer surface of the cap passes the annular groove 27 in the tube 9. Then a snap ring 32 is placed around the tube 9 to hold the cap 25 from upward movement on the tube 9. It is to be noted that the cap 25 is preferably held in a position slightly within the body of the cartridge to insure the filter material's remaining within the cartridge. The upper edge of the hole 26 is provided with an annular oil seal 28 to prevent oil from leaking between the tube and the cover during the operation of the device.

The packed filter cartridge may then be carried and handled readily by means of the bail 29 provided on the cap 25, as the cap is prevented from movement out of the body of the cartridge, as stated, and the cartridge may be placed in the housing 1 of the filter by alining the rod 5 with the bushings 10—10 and sliding the cartridge into the housing. The cover 17 may then be installed and the wing nut 23 tightened to seal the housing oil tight.

With the oil inlet line and oil outlet line (not shown) connected to their respective connections on the housing 1, the device is ready for operation when oil is pumped into the housing through the oil inlet 16, under pressure, of course. Pressure is built up in the housing and oil is forced through the filter material 13 and into the chamber 15 to pass through opening O to the oil outlet. It is well known that when some materials get wet they lose some of the resiliency they have when dry, and thereby, the mass of filter material may not be as tightly compressed when wet as when dry, and "channeling" could occur. Also, if there are certain areas in the filter material where the material was not tightly packed, channeling will develop and oil will pass through the filter without being treated properly.

However, as soon as oil pressure is built up in my filter and oil begins to move through same from the inlet to the outlet thereof, the cap 25 begins to perform its desired function of compressing the mass of filter material to prevent channeling and maintaining the mass under compression during the entire time that oil is being pumped through the filter.

The compressing of the mass of filter material is accomplished through the oil pressure on the cap 25 which forces and tends to force the cap inwardly into the body 12 of the filter, as shown in dotted lines at 29, at all times while oil is in motion through the filter. This action is possible in the sealed container, where one might expect the oil pressure to be equal everywhere in the container, because the oil is moving at different rates in the filter housing. Around the outer edges of the perforated body 12, the oil moves slowly as there are a great many openings through which it passes, and, only a predetermined quantity of oil may pass through the filter device in a given period of time due to the size of the inlet and outlet, and the pressure at which the oil is pumped.

However, as the oil passes through the tightly packed filter material, there is resistance to its movement, and the rate of flow increases progressively because of the less space available in which the oil may flow to reach the relatively few openings 14 in the tubular member 9. As is well known, when the rate of flow of a given quantity of a fluid increases, its pressure decreases; thereby, there is progressively less and less pressure present toward the center of the filter material to the tubular member 9, the pressure around the outer areas or walls of the cartridge being greater, of course.

As shown, the cap 25 is disc-like and has only the opening 26 therethrough, which opening has an oil seal 28 therein to prevent leakage between the cap and the tube 9. Thus, the entire outer area or surface 30 of the cap is acted on by the maximum oil pressure present in the filter housing, while the inner area of surface 31 of the cap has progressively less pressure thereon from its outer edge toward the center thereof. An unequal pressure against the opposed sides, 30 and 31, of the cap, obviously, will result in the cap moving in the direction of the greater force applied to the cap, or, inwardly with respect to said cartridge body 12, as shown in dotted lines at 33, until the opposing pressure created by the compression of the mass of filter material equalizes the oil pressure when the cap will remain stationary, though the pressure on the mass will be maintained, of course. This movement of the cap will cause the filter material to move inwardly also and, of course, the material will move at the points of least resistance, or where the mass is most loosely packed, thereby eliminating channeling from occurring.

As an example, let us assume that the cap was in its outermost position and a direct passage, or channel, for oil developed between the body 12 and one of the openings 14 in the tubular member 9. Obviously, the moving oil would take the path of least resistance and run rapidly through the channel or passage. Thereby, a low pressure area would be present and the higher pressure on the cap would immediately cause the cap to move inwardly to compress the mass and overcome the low pressure state. Obviously, once the device is put into operation, the cap reaction is substantially instantaneous in obtaining a desired state of compression in the mass, and once obtained, it is practically impossible for any undesirable condition to occur in the filter material mass.

As may readily be seen, the device above described will work equally well irrespective of the direction of flow of oil therethrough, as the pressure differential will still be the same.

When the filter material has been in use for its normal period of time, it is deemed apparent that the cartridge may be removed from the housing 1, the cap removed from the tube, and then the old filter material may be replaced by new filter material and the device may be put back into service as above. The cost of repacking my filter is, obviously, much less than would be the cost of an entire throw-away cartridge. In addition, my filter device provides constantly efficient filtering of liquids pumped through it irrespective of human failure in not packing the filter material properly.

It is to be understood that I have herein shown and described one specific embodiment of my invention, and that my appended claims are not necessarily limited specifically thereto, but should be construed as broadly as permissible in view of the prior art.

Having thus described my invention, what I claim is:

1. An oil device for filtering oils under pressure comprising a casing having one end open, a liquid outlet opening positioned centrally and extending through the wall at the opposite end of said casing, and a liquid inlet opening extending through a wall of said casing; a cover member detachably secured to said open end of said casing, a liquid outlet center tube centrally positioned within said casing with one end of said tube being secured to said liquid outlet opening and its opposite end detachably connected to said cover member, said outlet tube having outlet means therein to receive liquid; a liquid filter cartridge positioned within said casing and around said liquid outlet tube and slightly spaced therefrom, said filter cartridge comprising a substantially cylindrical perforated outer wall and a substantially cylindrical perforated inner wall connected to one another along their bottom perimetral edges by an imperforate bottom plate, waste filtering material packed in said filter cartridge between said inner and outer walls; a freely-floatable, imperforate cover plate slidably mounted between the inner and outer walls of said filter cartridge; a liquid seal between said cover plate and said liquid outlet tube to prevent the passage of liquid therebetween, the outlet means of the liquid outlet tube being smaller in number than those perforations of the inner wall of said filter cartridge with those perforations of said inner wall being smaller in number than the perforations of said outer wall of said cartridge to effect a pressure differential between that exerted on the periphery of the cartridge and the liquid outlet tube whereby such pressure differential will tend to force the slidable cover plate downwardly between the walls of said cartridge to compress the filter material.

2. A repackable filter cartridge for use in pressure liquid filters comprising a casing having a substantially cylindrical perforated outer wall and a substantially cylindrical perforated inner wall connected to one another along their bottom perimetral edges by an imperforate bottom plate to define the casing, packable filtering material positioned in said casing between said inner and outer walls thereof, a floatable imperforate cover plate slidably mounted between the inner and outer walls of said casing and a fluid seal positioned at the top of said inner wall of said casing to prevent the oil when the cartridge is in use from entering the oil outlet means of a filter except through the filter material, the perforations of the inner wall of said casing being smaller in number than the perforations of said outer walls of said casing to effect a pressure differential such that when the cartridge is in use the fluid pressure will tend to force the cover plate downwardly to compress the filter material present in said container.

References Cited in the file of this patent
UNITED STATES PATENTS

| | | |
|---|---|---|
| 2,280,033 | Oldham | Apr. 14, 1942 |
| 2,364,240 | Parry | Dec. 5, 1944 |
| 2,559,133 | Schultz | July 3, 1951 |
| 2,614,694 | Sather | Oct. 21, 1952 |